United States Patent [19]
Yoshigai

[11] Patent Number: 5,277,277
[45] Date of Patent: Jan. 11, 1994

[54] CANTILEVER BRAKE FOR A BICYCLE

[75] Inventor: Kenichi Yoshigai, Higashi-Osaka, Japan

[73] Assignee: Yoshigai Kikai Kinzoku Co., Ltd., Osaka, Japan

[21] Appl. No.: 814,817

[22] Filed: Dec. 31, 1991

[30] Foreign Application Priority Data

Jan. 9, 1991 [JP] Japan .................. 3-000300[U]

[51] Int. Cl.⁵ .............................................. B62L 1/06
[52] U.S. Cl. ........................... 188/24.19; 188/24.21
[58] Field of Search ............... 188/24.11, 24.12, 24.19, 188/24.21, 24.22

[56] References Cited

U.S. PATENT DOCUMENTS

| | | | |
|---|---|---|---|
| 4,597,474 | 7/1986 | Nagano | 188/24.21 |
| 4,754,853 | 7/1988 | Nagano | 188/24.19 |
| 4,793,444 | 12/1988 | Nagano | 188/24.19 |
| 4,838,386 | 6/1989 | Yoshigai | 188/24.19 |
| 5,058,450 | 10/1991 | Yoshigai | 188/24.19 |
| 5,082,092 | 1/1992 | Yoshigai | 188/24.21 |
| 5,117,948 | 6/1992 | Yoshigai | 188/24.12 |
| 5,123,295 | 6/1992 | Lo | 188/24.12 |

FOREIGN PATENT DOCUMENTS

| | | | |
|---|---|---|---|
| 0218991 | 9/1989 | Japan | 188/24.11 |
| 9011925 | 10/1990 | PCT Int'l Appl. | 188/24.11 |
| 0023092 | of 1898 | United Kingdom | 188/24.12 |

*Primary Examiner*—Robert J. Oberleitner
*Assistant Examiner*—Chris Schwartz

[57] ABSTRACT

A cantilever brake for a bicycle includes a pair of bolts each having a threaded portion engaged removably in the threaded bore of one of a pair of cantilever mounting bases fixed to a bicycle frame, a shank which is larger in diameter than its threaded portion, and a head which is larger in diameter than its shank. A pair of spring adjusting members are provided each fitted rotatably about the threaded portion of one of the bolts, and held by and between those end surfaces of the shank of the one bolt and of one of the cantilever mounting bases which face each other. A pair of cantilevers are provided each fitted rotatably about the shank of one of the bolts, and including a boss having a recess which is open towards one of the spring adjusting members. A pair of return springs are provided each housed in the recess of the boss of one of the cantilevers, and having one end engaging the boss of the one cantilever and another end engaging one of the spring adjusting members.

5 Claims, 3 Drawing Sheets

CANTILEVER BRAKE FOR A BICYCLE

FIELD OF THE INVENTION AND RELATED ART STATEMENT

This invention relates to a cantilever brake for a bicycle.

A known cantilever brake is, for example, described in U.S. Pat. No. 4,597,474. It includes a pair of cantilever mounting bases fixed to a bicycle frame, and each having a shaft on which a cantilever is rotatably supported. A bolt is threadedly connected with each shaft to hold the cantilever in position. A return spring is interposed between each cantilever and the corresponding cantilever mounting base.

The shaft forming an integral part of each cantilever mounting base has, however, made it complicated in shape and difficult to manufacture. The shaft has been easily broken. When the shaft has been broken, it has been impossible to change it, since the cantilever mounting base is welded to the bicycle frame. Another drawback of the known device has been that the forces of the return springs are not adjustable. Moreover, the known device has been difficult to transport during a process for the fabrication of a bicycle. The mounting bolts have been so small in length that it has been impossible to put together the parts of the brake into a unitary assembly prior to its transportation to the subsequent step of the process, and there has been no alternative but to transport the individual parts without putting them together.

OBJECTS AND SUMMARY OF THE INVENTION

It is, therefore, an object of this invention to provide a cantilever brake for a bicycle having cantilever mounting bases which are very simple in shape, and easy to manufacture, and return springs of which the forces are adjustable.

It is another object of this invention to provide a cantilever brake for a bicycle having cantilever supporting shafts which can be changed if broken.

It is still another object of this invention to provide a cantilever brake for a bicycle which can be transported as a unitary assembly.

These objects are essentially attained by a cantilever brake for a bicycle which comprises:

a pair of bolts each having a threaded portion engaged removably in a threaded bore in one of a pair of cantilever mounting bases fixed to a bicycle frame, a shank which is larger in diameter than the threaded portion, and a head which is larger in diameter than the shank;

a pair of spring adjusting means each fitted rotatably about the threaded portion of one of the bolts, and held between the end surfaces of the shank of the one bolt and of one of the cantilever mounting bases when face each other;

a pair of cantilevers each fitted rotatably about the shank of one of the bolts, and including a boss having a recess which is open toward one of the spring adjusting means; and a pair of return springs each housed in the recess of the boss of one of the cantilevers, and having one end fastened to the boss and another end engaging one of the spring adjusting means.

The cantilever mounting bases can be in a simple cylindrical shape and are, therefore, easy to manufacture, insofar as it is sufficient for each base to have a threaded bore for receiving a bolt therein. The spring adjusting means are rotatable to adjust the forces of the return springs. The bolts are sufficiently long to support the cantilevers and other parts of the brake thereon to form a unitary assembly which is easy to transport to the subsequent step of a process for the fabrication of the bicycle. The bolts can be changed to new ones if they are broken.

DETAILED DESCRIPTION OF THE PREFERRED EMBODIMENT

Figure 1:
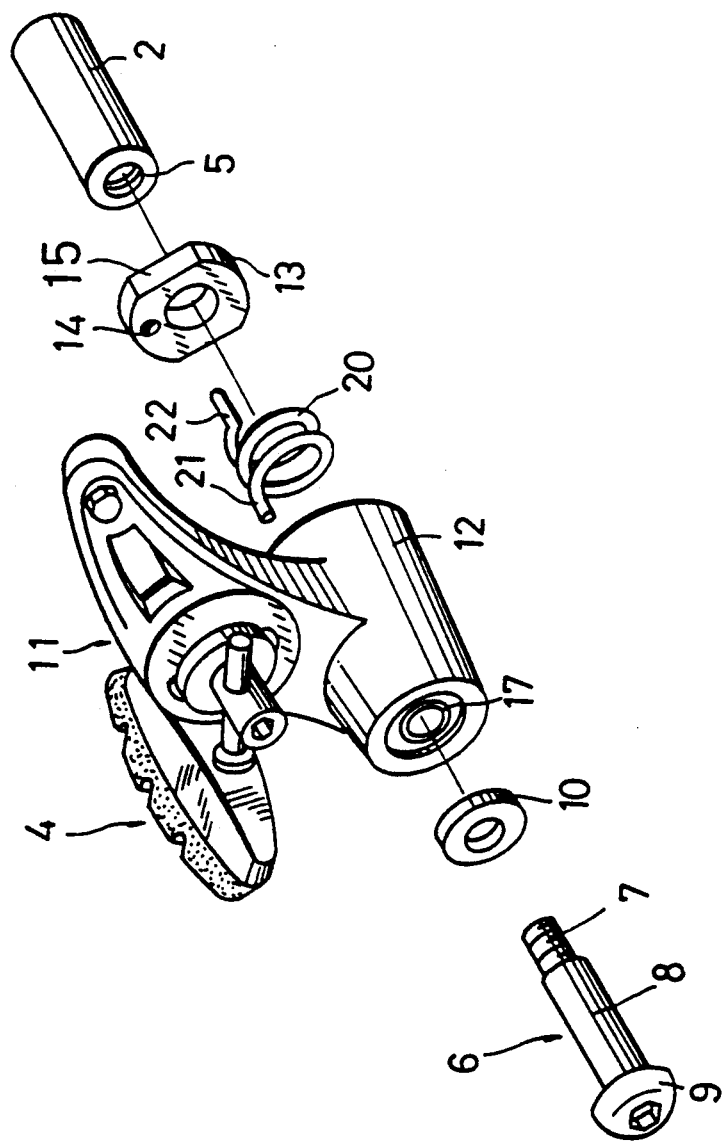
FIG. 1 is an exploded perspective view of a part of a cantilever brake embodying this invention.
Figure 2:
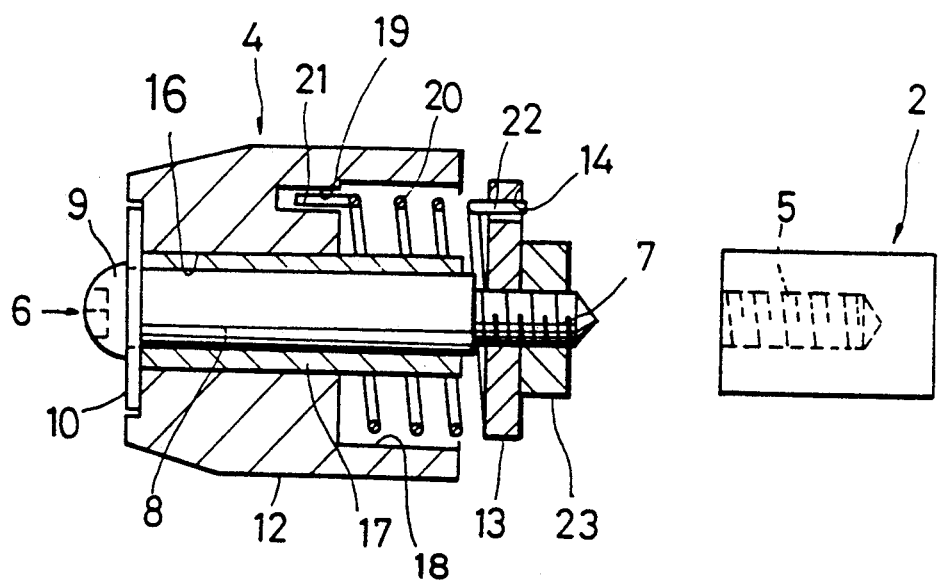
FIG. 2 is a side elevational view, partly in section, of a part of the brake as assembled for transportation prior to its attachment to a bicycle.
Figure 3:
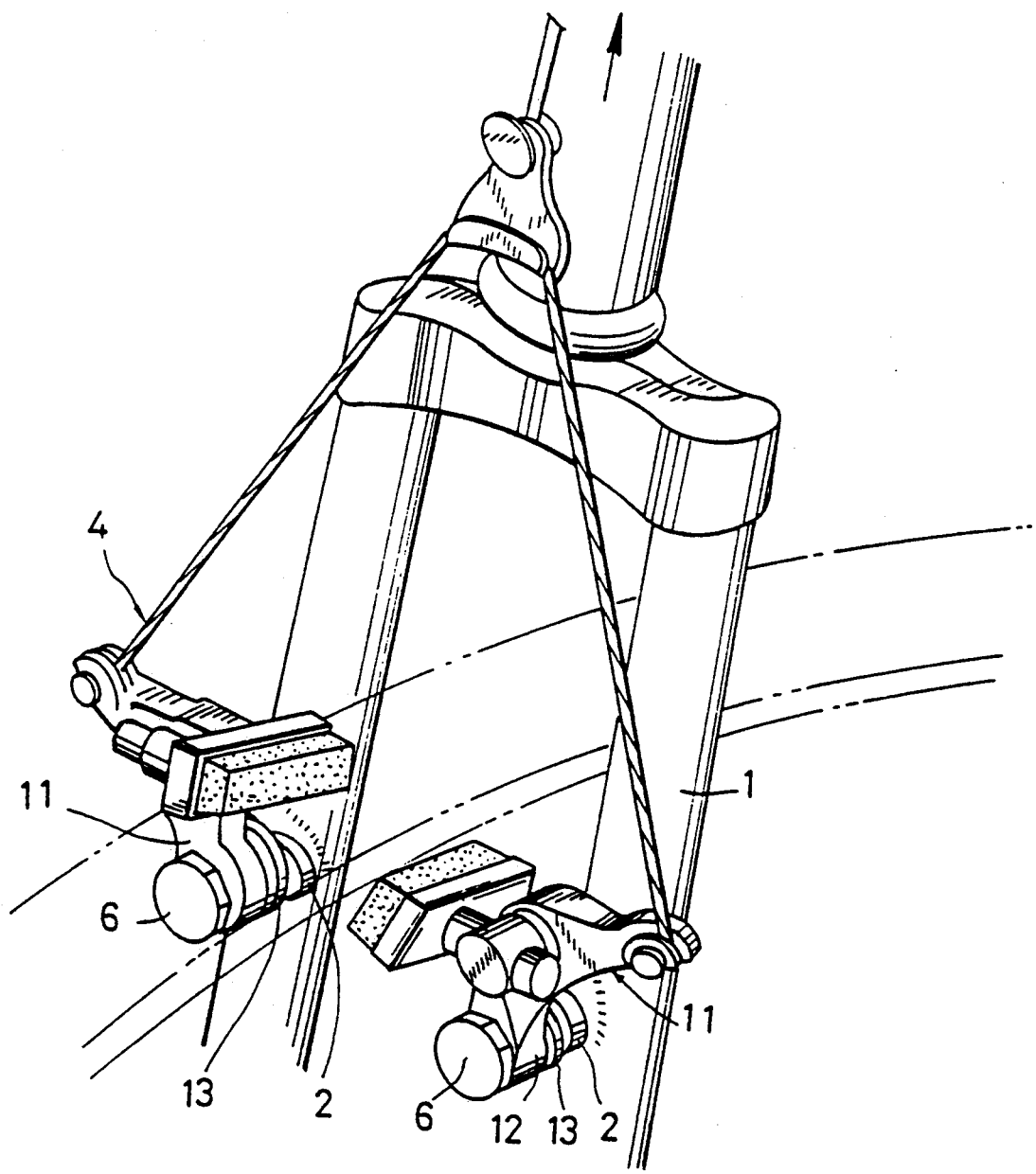
FIG. 3 is a perspective view of the brake attached to the bicycle.

Referring first to FIG. 3, there is shown a part of a bicycle frame, or a front fork at 1. The fork 1 is made of synthetic resin such as reinforced plastic or a nonferrous metal, such as aluminum, and carries a pair of cantilever mounting bases 2 made of synthetic resin such as reinforced plastic or aluminum, and secured by welding, or otherwise. A cantilever brake 4 embodying this invention is mounted on the bases 2 for braking a wheel 3. Each cantilever mounting base 2 is cylindrical and has a threaded axial bore 5, as shown in FIGS. 1 and 2.

The cantilever brake 4 includes a pair of bolts 6 made of iron, and engaged removably in the threaded bores 5 of the bases 2, respectively. Each bolt 6 has a threaded portion 7 engaged in the threaded bore 5 of one of the bases 2, a shank 8 having a diameter which is larger than that of the threaded portion 7, and a head 9 having a diameter which is larger than that of the shank 8. A washer 10 and a boss 12 on a cantilever 11 are fitted about the shank 8 of each bolt 6. The washer 10 contacts the head 9 of the bolt 6 and holds the cantilever 11 against displacement past the head 9. The threaded portion 7 of the bolt 6 projects from the boss 12 at its end remote from the washer 10, and a disk 13 defining spring adjusting means is rotatably supported on the threaded portion 7. The disk 13 has a spring engaging hole 14. The disk 13 also has a pair of parallel flat outer surfaces 15 adapted for engagement by a tool.

The boss 12 of each cantilever 11 has an axial bore 16 in which a bushing 17 is fitted, and the bushing 17 is rotatably fitted about the shank 8 of the bolt 6. The bore 16 is enlarged in diameter to define a recess 18 which is open toward the disk 13. The boss 12 has a spring engaging hole 19 at the bottom of its recess 18. A return spring 20 is housed in the recess 18 of each cantilever 11. The return spring 20 is a coiled spring having one end 21 engaged in the spring engaging hole 19, and another end 22 held in the spring engaging hole 14 of the disk 13.

FIG. 2 shows the brake 4 as assembled for transportation from the brake assembling step of a bicycle manufacturing process to the step for attaching it to the bicycle frame. As is obvious therefrom, each bolt 6 carries the cantilever 11, disk 13, etc. and a nut 23 fitted on its threaded portion 7 for holding the brake 4 in its assembled form.

When the brake 4 has been transported to the step for attaching it to the bicycle frame, the nuts 23 are removed from the bolts 6 and the threaded portion 7 of each bolt 6 is screwed into the threaded bore 5 of the corresponding cantilever mounting base 2 on the front fork 1 of the bicycle, whereby the brake 4 is mounted on the bicycle, as shown in FIG. 3. The tightening of each bolt 6 enables the corresponding disk 13 to be held against rotation by and between the mutually facing end surfaces of the corresponding base 2 and of the shank 8 of the bolt 6. The bushing 17 in each cantilever 11 is smaller in length than the shank 8 of the corresponding bolt 6, so that the cantilever 11 is rotatably mounted relative to the bolt, even after the bolt 6 has been tightened.

The force of each return spring 20 can be adjusted if the corresponding bolt 6 is slightly loosened, and if a tool is engaged with the flat surfaces 15 of the corresponding disk 13 to rotate it to thereby alter the torsional strength of the spring 20. After the torsion strength of the spring 20 is adjusted, the bolt 6 is tightened again to hold the disk 13 against rotation.

While the invention has been described with reference to a preferred embodiment thereof, it is to be understood that modifications or variations may be made by anybody of ordinary skill in the art without departing from the scope of this invention which is defined by the appended claims.

What is claimed is:

1. A cantilever brake mounted removably on a pair of cantilever mounting bases fixed to a bicycle frame and each having a threaded bore, said cantilever brake comprising:

a pair of bolts each having a threaded portion engaged in said threaded bore of one of said cantilever mounting bases, a shank which is larger in diameter than said threaded portion, and a head which is larger in diameter than said shank;

a pair of spring adjusting means each fitted rotatably about said threaded portion of one of said bolts, and held by and between those end surfaces of said shank of said one bolt and of one of said cantilever mounting bases which face each other;

a pair of cantilevers each fitted rotatably about said shank of one of said bolts, and including a boss having a recess open towards one of said spring adjusting means; and a pair of return springs each housed in said recess of said boss of one of said cantilevers, and having one end engaging said boss and another end engaging one of said spring adjusting means;

wherein said spring adjusting means is rotated relative to the threaded portion of said bolt for adjusting torsional strength of said return spring.

2. A cantilever brake as set forth in claim 1, wherein said bolts are longer than said bosses of said cantilevers.

3. A cantilever brake as set forth in claim 1, wherein each of said spring adjusting means is a disk having an engaging hole in which said other end of one of said return springs is engaged, and a pair of outer peripheral surface portions adapted for engagement by a tool.

4. A cantilever brake as set forth in claim 1, wherein said bicycle frame and said cantilever mounting bases are each made of a synthetic resin such as reinforced plastics while said bolts are each made of a ferrous metal.

5. A cantilever brake as set forth in claim 1, wherein said bicycle frame and said cantilever mounting bases are each made of a nonferrous metal such as aluminum, while said bolts are each made of a ferrous metal.

* * * * *